United States Patent
Kong et al.

(10) Patent No.: US 12,079,694 B2
(45) Date of Patent: Sep. 3, 2024

(54) TRAINING MACHINE LEARNING MODELS WITH TRAINING DATA

(71) Applicants: VOLKSWAGEN AKTIENGESELLSCHAFT, Wolfsburg (DE); PORSCHE AG, Stuttgart (DE); AUDI AG, Ingolstadt (DE)

(72) Inventors: Liang Kong, Santa Clara, CA (US); Oleg Tolstov, San Carlos, CA (US)

(73) Assignees: Volkswagen Aktiengesellschaft, Wolfsburg (CH); Porsche AG, Stuttgart (DE); Audi AG, Ingolstadt (DE)

( * ) Notice: Subject to any disclaimer, the term of this patent is extended or adjusted under 35 U.S.C. 154(b) by 1042 days.

(21) Appl. No.: 17/006,371

(22) Filed: Aug. 28, 2020

(65) Prior Publication Data
US 2022/0067570 A1 Mar. 3, 2022

(51) Int. Cl.
| | |
|---|---|
| G06N 20/00 | (2019.01) |
| G06F 18/214 | (2023.01) |
| G06N 3/044 | (2023.01) |
| G06N 3/045 | (2023.01) |
| G06N 3/08 | (2023.01) |
| G06V 10/774 | (2022.01) |
| G06V 10/776 | (2022.01) |

(Continued)

(52) U.S. Cl.
CPC ........... *G06N 20/00* (2019.01); *G06F 18/214* (2023.01); *H04L 9/0637* (2013.01); *H04L 9/3236* (2013.01); *G06N 3/044* (2023.01); *G06N 3/045* (2023.01); *G06N 3/08* (2013.01); *G06V 10/774* (2022.01); *G06V 10/776* (2022.01); *G06V 10/82* (2022.01); *G06V 20/43* (2022.01); *H04L 9/0825* (2013.01); *H04L 9/50* (2022.05)

(58) Field of Classification Search
CPC ........ G06N 20/00; G06N 3/044; G06N 3/045; G06N 3/08; G06F 18/214; H04L 9/0637; H04L 9/3236; H04L 9/50; H04L 9/0825; G06V 10/776; G06V 10/82; G06V 20/46; G06V 10/774
See application file for complete search history.

(56) References Cited

U.S. PATENT DOCUMENTS

| | | | |
|---|---|---|---|
| 2018/0032446 A1* | 2/2018 | Amarendran | G06N 5/02 |
| 2020/0005187 A1* | 1/2020 | Bendre | H04L 67/60 |

(Continued)

OTHER PUBLICATIONS

Liu et al.,( "Blockchain and Machine Learning for Communications and Networking Systems" Published May 28, 2020—Total 40 pages (Year: 2020).*

*Primary Examiner* — Quoc A Tran
(74) *Attorney, Agent, or Firm* — Womble Bond Dickinson (US) LLP

(57) ABSTRACT

In one embodiment, a method is provided. The method includes storing a set of training data. One or more machine learning models are trained based on the set of training data. The method also includes receiving, from a computing device, a request to access the set of training data. The method further includes determining whether the computing device is allowed to access the set of training data. In response to determining that the computing device is allowed to access the set of training data, the method includes transmitting a training token to the computing device. The training token grants a training environment with access to the set of training data for a period of time.

20 Claims, 8 Drawing Sheets

(51) Int. Cl.
  *G06V 10/82*  (2022.01)
  *G06V 20/40*  (2022.01)
  *H04L 9/00*   (2022.01)
  *H04L 9/06*   (2006.01)
  *H04L 9/08*   (2006.01)
  *H04L 9/32*   (2006.01)

(56) References Cited

U.S. PATENT DOCUMENTS

2020/0175962 A1\* 6/2020 Thomson ................. G10L 15/30
2020/0334567 A1\* 10/2020 Bhattacharjee ....... H04L 67/125
2020/0334930 A1\* 10/2020 Masood ................. G07C 9/257

\* cited by examiner

TRAINING MACHINE LEARNING MODELS WITH TRAINING DATA

TECHNICAL FIELD

Aspects of the present disclosure relate to machine learning models, and more particularly, to training machine learning models with training data.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Machine learning models may also be used to generate inferences, actions, decisions, etc., based on data that is received from various devices (e.g., based on sensor data, such as images/videos). To improve the operation of the machine learning models, training data is often used to train the machine learning models prior to their operation. Thus, using good training data is useful for the proper and/or improved operation (e.g., execution) of machine learning models.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, machine learning models are often use to allow devices/machines to operate autonomously. In addition, machine learning models may also be used to generate inferences, actions, decisions, etc., based on data that is received from various devices. Using good training data is important/useful for the proper operation (e.g., execution) of machine learning models. For example, training a machine learning model with good training data may allow the machine learning model to generate more accurate inferences or to make better decisions.

The collection, creation, curation, etc., of training data is often a difficult, costly, and/or complicated task. For example, it may be time consuming and/or difficult to select the appropriate images, videos, text, and/or other data that should be included in the training data. In another example, it may be costly to deploy sensors (e.g., cameras, radar, etc.) to collect data which may be used as training data. Thus, once the training data is collected, created, curated, etc., the training data is often kept secret, confidential, private, etc. Sharing the training data may allow other entities (e.g., other users, other organizations, etc.) to copy the training data. In addition, the owner of the training data may lose the ability to control who has access to the training data, once the training data is publicly shared.

The examples, implementations, and embodiments described herein may help address these issues when allowing access to training data for training machine learning models. In one embodiment, the training data is stored on a storage system which may allow only a training environment (e.g., a secure environment) to retrieve and/or access the training data. The training data may be inaccessible to all computing devices and/or machine learning models outside of the training environment and/or storage system (e.g., may be inaccessible to external devices). When a machine learning model is granted access to or is allowed to use the training data, the training data is temporarily copied to the training environment. The machine learning models are allowed to execute, run, operate, etc., using the training data. However, the secure environment may prevent the machine learning model from copying the training data outside of the training environment (e.g., prevent the training data from being transmitted to another computing device outside of the training environment). After the machine learning model is trained using the training data, the training environment may delete the training data. The examples, implementations, and embodiments described herein allow machine learning models to be trained using private, proprietary, confidential, etc., training data while prevent preventing other computing devices from being able to see or view the actual training data. This allows the training data to be used to train other machine learning models while keeping the training data private/confidential.

Figure 1:
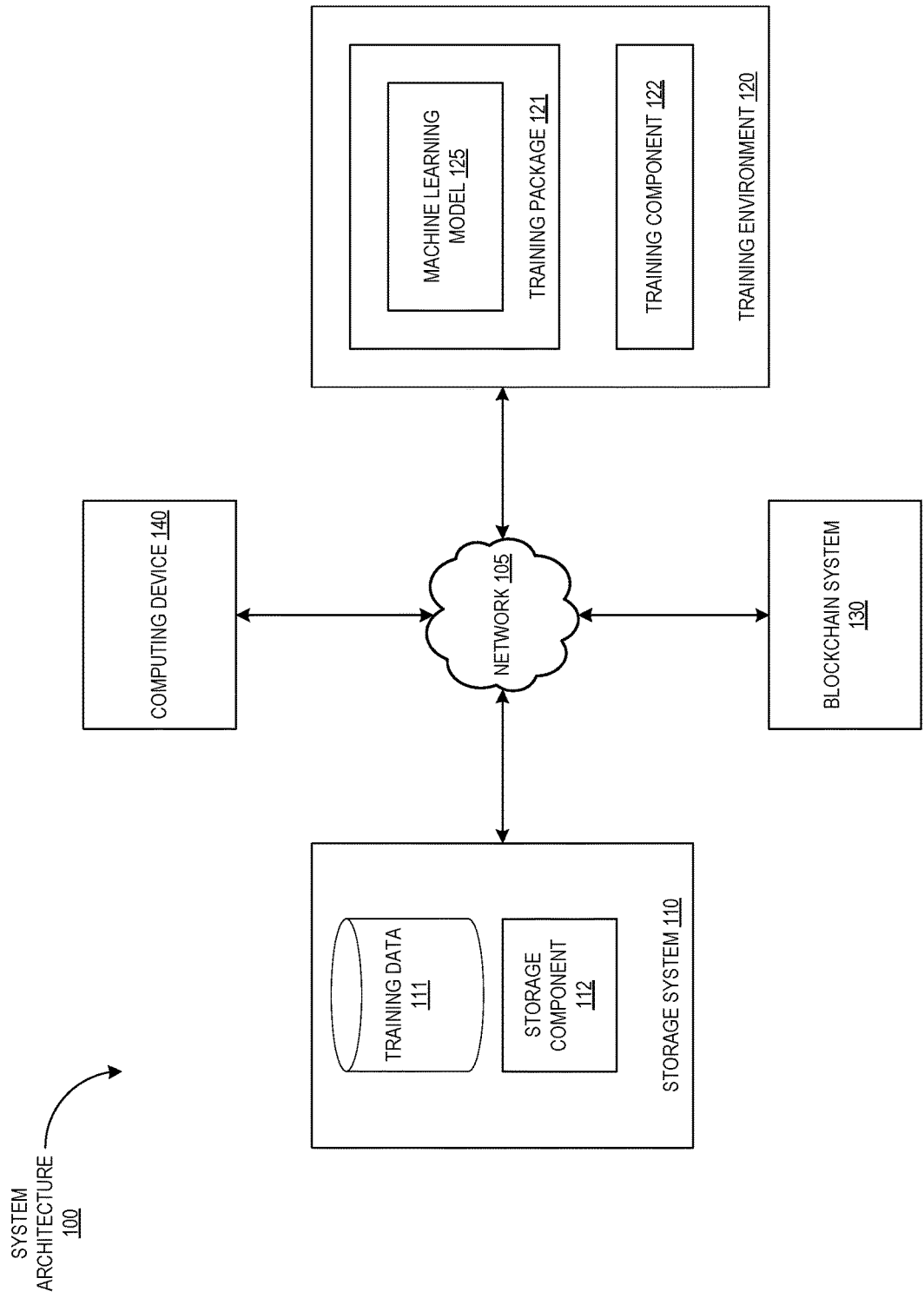
FIG. 1 is a block diagram that illustrates an example system architecture, in accordance with one or more embodiments of the present disclosure.

FIG. 1 is a block diagram that illustrates an example system architecture 100, in accordance with some embodiments of the present disclosure. The system architecture 100 includes a storage system 110, a training environment 120, a blockchain system 130, a computing device 140, and network 105. The network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. The network 105 may carry communications (e.g., data, message, packets, frames, etc.) between the storage system 110, the training environment 120, the blockchain system 130, and/or the computing device 140.

Each of the storage system 110, storage component 112, blockchain system 130, training environment 120, training component 122, and computing device may be physical computing devices and/or virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. The container may share the kernel, libraries, and binaries of the host OS with other containers that are executing on the computing device.

In one embodiment, the computing device 140 may be associated with the machine learning model 125. For example, the computing device 140 may be owned and/or operated by an entity (e.g., a user, a company, etc.) that may want to train the machine learning model 125. The computing device 140 may request access to the training data 111 and may provide the machine learning model 125 to the training environment 120 for training, as discussed in more detail below.

In one embodiment, the storage system 110 may include any combination of multiple computing devices, virtual machines (VMs), containers, etc. For example, the storage system 110 may be a cluster, group, etc., of computing devices. The storage system 110 may also be referred to as a data storage system. Each of the computing devices may include various different types of data storage devices, such as hard disk drives (HDDs), solid state drives (SSD), hybrid drives, storage area networks, storage arrays, etc. The training data 111 may be stored on the data storage devices (e.g., stored on one or more of HDDs, SSDs, NVME drives, etc.) of the storage system 110. The storage system 110 may be separate from the training environment 120. For example, the storage system 110 may include different computing devices than the training environment 120, may be located at a different location, etc. In some embodiments, the storage system 110 may include cloud storage resources and/or cloud storage platforms. The cloud storage resources/platforms may allow for the dynamic scaling of storage space. For example, if additional storage space is needed to store additional training data, the storage space may be scaled up and/or increased to accommodate the additional training data.

In one embodiment, the storage component 112 may store training data 111 in the storage system 110. As discussed above, the storage system 110 may include any combination of multiple computing devices, VMs, containers, etc. The computing devices may include data storage devices (e.g., HDDs, SSDs, NVME drives, etc.) that store the training data 111. The storage component 112 may receive data from an owner, manager, entity, etc., that has control and/or ownership over the training data 111. For example, the storage component 112 may receive the training data 111 from a server computer, computing device, etc., of an entity/user that owns and/or has control over the training data 111. The storage component 112 may store the training data 111 in the storage system 110 (e.g., in data storage devices).

In one embodiment, the training data 111 may be used to train various machine learning models. For example, a machine learning model 125 may use the training data 111 to set one or more weights in the machine learning model 125. The training data may be tagged, sorted, annotated, labeled, categorized, etc. For example, the training data may be associated with metadata, tags, labels, etc., that may help indicate one or more scenarios, situations, objects, conditions, etc., that may be depicted/represented by the training data 111. This may allow the computing device 140 to select a set of the training data 111 to use for training the machine learning model 125. For example, the computing device 140 may select images of cats or videos of a forest to use for training the machine learning model 125. Examples, of training data may include, but are not limited to, images, videos, sensor data, text, etc.

In one embodiment, the storage component 112 may receive a request from computing device 140 to access the training data 111. For example, computing device 140 may transmit message to the storage component 112 to request access to the training data 111 so that the machine learning model 125 can be trained using the training data 111. The computing device 140 may also optionally transmit the machine learning model 125 to the training environment 120 (e.g., as part of training package 121), as discussed in more detail below.

In one embodiment, the storage component 112 may determine whether the computing device 140, the machine learning model 125, and/or the training package 121, should be allowed access to the training data 111. For example, the storage component 112 may authenticate a user, account, credentials (e.g., a username and/or a password) etc., associated with the computing device 140, the machine learning model 125, and/or the training package 121.

In one embodiment, if the computing device 140 is allowed to access the set of training data 111, the storage component 112 may transmit a training token to the computing device 140. The training token may include credentials that grant and/or allow access to training data 111 for a period of time. For example, the training token may allow the training environment 120 to retrieve a set of training data that may be used to train the machine learning model 125 that was received as part of the training package 121. The training token may also be referred to as an access token.

In one embodiment, the storage component 112 may transmit the training token directly to the computing device 140 (via network 105). For example, the storage component 112 may transmit a message (e.g., email, packet, frame, etc.) addressed to the computing device 140 (e.g., addressed to a network address of the computing device 140). The message may include the training token. In another embodiment, the storage component 112 may provide the training token to the computing device 140 via the blockchain system 130. For example, the storage component 112 may encrypt the training token using a public key of the computing device 140. The storage component 112 may store the encrypted training token in the blockchain system 130 (e.g., write the encrypted training token to a ledger of the blockchain system 130). The computing device 140 may retrieve the encrypted training token from the blockchain system 130 and may decrypt the encrypted training token using a private key of the computing device 140 (e.g., a private key that corresponds to the public key that was used to encrypt the training token).

In one embodiment, the storage component 112 may receive a request from the training environment 120 to retrieve and/or access the training data 111 (e.g., to retrieve and/or access one or more sets of training data stored on the storage system 110). The request from the training environment 120 may include a training token. For example, computing device 140 may request access to the training data 111 to train machine learning model 125, as discussed above. The computing device 140 may be provided a training token (e.g., directly or via the blockchain system 130) after computing device 140 has been authenticated. The computing device 140 may transmit a training package 121 that includes to the machine learning model 125. The training package 121 may also include the training token (which grants temporary access to the training data 111 and/or portions of the training data 111). Alternatively, the computing device 140 may provide the training token to the training environment 120 separate from the training package 121. For example, the computing device 140 may directly transmit the training token to the secure environment 120 (e.g., to the training component 122). In another example, the computing device 140 may encrypt the training token using a public key of the training environment 120 and may store the encrypted training token in the blockchain system 130. The training environment 120 may include the training token in the request to access the training data 111.

In one embodiment, the storage component 112 may authenticate the request received from the training environment 120 to access the training data 111. For example, the storage component 112 may verify the authenticity of the training token. The storage component 112 may verify one or more digital signatures to determine whether the training token is valid (e.g., determine whether the training token includes a digital signature of the storage system 110). In another example, the storage component 112 may verify a time frame, time period, etc., for the training token. For example, the training token may be valid for and/or may grant access to the training data 111 for a period of time (e.g., for two hours, one day, one week, or some other appropriate period of time after the training token was created and/or sent to the computing device 140). The storage component 112 may verify that request (received from the training environment 120 to access the training data 111) was received during the time period (e.g., period of time) which the training token is valid. If the training token is valid, the storage component 112 may transmit the training data 111 (and/or portions of the training data 111 that were requested) to the training environment 120. For example, a copy of the training data 111 may be transmitted to the training environment 120. The training environment 120 may (temporarily) store the copy of the training data 111 on one or more data storage devices of the training environment 120.

In one embodiment, the request transmitted by the training environment 120 to access the training data 111 (e.g., by the training component 122) may include the training token that was provided to the computing device 140 by the storage system 110. As discussed above, the computing device 140 may provide the training token to the training environment 120 (e.g., as part of training package 121 or separate from training package 121). The training environment 120 may include the training token to the storage system 110 as part of the request to access the training data so that the storage system 110 may authenticate the training token.

In one embodiment, the request transmitted by the training environment 120 to access the training data 111 (e.g., by the training component 122) may include data and/or other information that may be used to identify the machine learning model 125. For example, the request to access the training data 111 may include a name, an identification number, an alphanumeric identifier etc., for the machine learning model 125. In another example, the request may include a hash, fingerprint, etc., generated based on the machine learning model 125.

In one embodiment, the request transmitted by the training environment 120 to access the training data 111 (e.g., by the training component 122) may include data and/or other information that may be used to identify the computing device 140. For example, the request may include the username of a user of the computing device 140. In another example, the request may include a network address (e.g., an internet protocol (IP) address, a medium access control (MAC) address, etc.) of the computing device 140.

In one embodiment, the request transmitted by the training environment 120 to access the training data 111 (e.g., by the training component 122) may include data and/or other information that may be used to identify the training data 111 and/or a portion of the training data 111 (e.g., a particular set of training data). For example, the request may include a name, an alphanumeric string, labels, tags, labels, categories, etc., that may be used to identify a particular set of training data 111.

In one embodiment, the storage component 112 may provide instructions and/or an indication that the training data 111 (and/or portions of the training data 111) that is transmitted to the training environment (and used to train machine learning models) are to be deleted after a period of time. For example, storage component 112 may transmit a message indicating that the training environment 120 should delete the copy of the training data that is stored in the training environment 120. In another example, the storage component 112 may transmit a message indicating a time (e.g., a specific date and/or time) when the copy of the training data 111 that is stored in the training environment 120 should be deleted.

In another embodiment, the training environment 120 may automatically delete the training data 111. For example, the training token granted to the computing device 140 may valid for a period of time (e.g., valid for 24 hours after the training token was transmitted to the computing device 140). When the training environment 120 receives the training token from the computing device 140, the training environment 120 may determine the period of time for which the training token is valid. The training environment 120 may delete the training data after the period of time has passed, elapsed, expired, etc.

In one embodiment, the storage component 112 may generate a hash of the training data 111. For example, the training data may include a video (e.g., a digital video). The storage component 112 may generate a hash of each frame (e.g., each picture, image, etc.) of the digital video. In another example, the training data may be one or more images (e.g., a digital image, a picture, etc.). The storage component 112 may generate a hash for each image. In a further example, the training data may be a sequence of sensor data. The storage component 112 may generate a hash for each piece/portion of the sensor data. The hashes of the training data 111 that are generated by the storage component 112 may be used to verify the training data 111, as discussed in more detail below. Various algorithms, functions, methods, formulas, equations, etc., may be used to generate the hashes. For example, a Merkle tree can be used to hash every frame of a video or every portion of a stream of sensor data.

In one embodiment, the storage component 112 may receive a request for the hashes of the training data 111, from the computing device 140. For example, after the machine learning model 125 has been trained in the training environment 120 using the training data 111, the computing device 140 may want to verify that the correct training data was used to train the machine learning model 125. The computing device 140 may transmit a request for the hashes of the training data 111 that was used to train the machine learning model 125. For example, the computing device 140 may request a particular video (e.g., a set of training data 111) to train the machine learning model 125. The video may have been provided by the storage system 110 to the training environment 120 to train the machine learning model 125. To verify that the correct video was used to train the machine learning model 125, computing device 140 may request the hashes of the video and the storage component 112 may provide the hashes of the video to the computing device 140. For example, the storage component 112 may transmit the hashes directly to the computing device 140. In another example, the storage component 112 may store the hashes in the blockchain system 130 for the computing device 140 to retrieve (e.g., may encrypt the hashes with a public key of the computing device 140 and store the encrypted hashes on a ledger of the blockchain system 130). The computing device 140 may compare the hashes of the video (e.g., the hashes of the frames) generated by the storage component 112 with hashes of the video that are generated by the training component 122 and/or by the training package 121, as discussed in more detail below.

In one embodiment, the storage component 112 may receive a request for the hashes of the training data 111, from the training environment 120 (e.g., the training component 122). For example, as the machine learning model 125 has been trained in the training environment 120 using the training data 111, the training component 122 and/or the training package 121 may generate hashes of the training data. Using the hashes provided by the storage system 110 (e.g., a first set of hashes transmitted directly or via the blockchain system 130) and the hashes generated by the training component 122 and/or the training package 121 (e.g., a second set of hashes), the training component 122 and/or the training package 121 may be able verify that the correct training data was used to train the machine learning model 125 (e.g., by comparing the two sets of hashes).

In one embodiment, the storage system 110 may also transmit provide a rating token to the computing device 140. For example, the storage system 110 may directly transmit the rating token to the computing device 140. In another example, the storage system 110 may encrypt the rating token with a public key of the computing device 140 and may store the encrypted rating token in the blockchain system 130 for the computing device 140 to retrieve and decrypt using a private key of the computing device 140. The rating token may allow the user to provide a rating (e.g., a score, rank, grade, assessment, evaluation, etc.) of the training data 111. For example, the rating token may allow the computing device 140 to add a rating to the blockchain system 130 (e.g. to add a rating for the training data 111 to the ledger of the blockchain system 130). In another example, the rating may allow the computing device 140 to access another computing device (e.g., a server) where the computing device 140 may provide the rating. The rating may be data that may indicate of how useful, good, etc., the training data 111 was for training the machine learning model 125. For example, the rating may be a number from a scale of one to ten, with ten being the highest score and one being the lowest score. If the inferences (e.g., output, results, etc.) generated by the machine learning model 125 are more accurate after the machine learning model 125 was trained using the training data, the computing device 140 (e.g., a user of the computing device 140) may provide a higher rating (e.g., 9 or 10). If the inferences (e.g., output, results, etc.) generated by the machine learning model 125 are less accurate after the machine learning model 125 was trained using the training data, the computing device 140 (e.g., a user of the computing device 140) may provide a lower rating (e.g., 5). In some embodiments, the ratings may also include other data that may be used to rate (e.g., evaluate, score, rank, etc.) the training data 111. For example, the ratings may include a text write-up and/or description that may provide additional details and/or information about how useful the training data 111 was in training the machine learning model 125.

In one embodiment, one or more ratings for the training data 111 may be stored in the blockchain system 130. For example, each rating provided by each computing device that requested and/or was granted access to the training data 111 may be store in the blockchain system 130. Other users and/or computing devices may be able to read the one or more ratings by accessing the ledger of the blockchain system 130. In another embodiment, the one or more ratings may be stored on another computing device (e.g., a separate server) and users and/or computing devices may be able to read the ratings by accessing the other computing device.

In one embodiment, the training data 111 may be inaccessible to computing devices and/or machine learning models outside of the training environment 120 (e.g., may be inaccessible to external devices). For example, machine learning models that are not granted access to the training data 111 and/or are not located within the training environment may be unable to access the training data 111. In addition, the training environment 120 (e.g., the training component 122) may prevent communications between the machine learning models and/or training packages within the training environment 120, and outside computing devices (e.g., computing devices located outside of the training environment).

In one embodiment, the training component 122 may receive the training package 121 from the computing device 140. For example, the computing device 140 (e.g., a user of the computing device, a data scientist, a data engineer, a programmer, etc.) may want to train the machine learning model 125 using the training data 111. The computing device 140 may transmit the training package 121 to the training environment 120. As illustrated in FIG. 1, the training package includes the machine learning model 125 that is to be trained in the training environment 120, using the training data 111. The training package 121 may also include other components, modules, libraries, other support software, etc., that may be used to execute and/or run the machine learning model. For example, the training package 121 may include tensor libraries, scripts, etc., that may be used to execute/run the machine learning model 125. The computing device 140 may transmit the training package 121 to the training environment 120 directly and/or via the blockchain system 130. As discussed above, the training package 121 may include the training token that was granted/provided to the computing device 140. Alternatively, the computing device 140 may provide the training token to the training environment separate from the training package 121 (e.g., in a separate message, via the blockchain system 130, etc.). The training token may grant the machine learning model 125 access to the training data 111 when the machine learning model 125 is executing/running within the training environment 120.

In one embodiment, the training component 122 may retrieve training data 111 (or a portion of the training data 111) from the storage system 110. For example, the training component 122 may transmit a request (e.g., a message, packet, frame, etc.) to the storage system 110 to retrieve the training data 111. The request may include the training token that was provided by the computing device 140 (e.g., provided in the training package 121, directly from the computing device 140, or via the blockchain system 130). As discussed above, the request may also include other data and/or information that may allow the storage system 110 to identify the machine learning model 125 and/or the portion of the training data 111 that is being requested. For example, the request may include one or more of the training token, an identifier for the computing device 140, an identifier for the machine learning model 125, and an identifier for the set of training data that is being requested (e.g., the portion of the training data 111 that is being requested). The storage system 110 (e.g., the storage component 112) may authenticate the training token (e.g., determine the request is received within the time period in which the training token is valid, authenticating one or more digital signatures, etc.). The storage system 110 may transmit the requested training data 111 to the training environment 120 if the training token is authenticated. The training component 122 may receive the training data 111 and may temporarily store the training data 111 on data storage devices within the training environment 120 to allow the machine learning model 125 to use the training data 111.

In one embodiment, the training component 122 may train the machine learning model 125 within the training environment 120 using the training data 111 that was requested from the storage system 110. For example, the training component 122 may execute, install, run, various libraries, packages, modules, components, and/or other support software that was included in the training package 121. The training component 122 may also execute/run the machine learning model 125 and may provide the training data 111 to the machine learning model 125 to train the machine learning model 125. For example, the weights of the connections between the nodes of the machine learning model 125 (e.g., a neural network) may be set/assigned after the machine learning model 125 executes/runs and processes the training data 111.

In one embodiment, the training data 111 may be temporarily stored within the training environment 120. For example, the training data 111 may be stored on data storage devices (or other data stores) of the training environment 120 while the machine learning model 125 is being trained. After the machine learning model 125 has been trained, the training data 111 may be deleted from the training environment 120 (e.g., deleted from the data storage devices of the training environment 120). In another example, the training token (which was used to retrieve the training data 111 from the storage system 110) may be valid for a period of time. The training component 122 may delete the training data 111 from the training environment 120 after the period of time passes/expires.

In one embodiment, the training data 111 is inaccessible by computing devices and/or machine learning models outside of the training environment 120 (e.g., is inaccessible by external devices). For example, storage system 110 may not transmit the training data 111 (or a portion of the training data 111) to any other computing device, systems, environments, etc., other than the training environment 120 (e.g., may transmit the training data only to the training environment 120). As discussed, the training environment 120 may retain the training data 111 for a period of time and may delete the training data after the period of time.

In one embodiment, the training environment and/or the training component 122 may prevent the machine learning model 125 and/or the training package 121 from communicating with computing devices that are outside of the training environment 120. For example, the training environment and/or the training component 122 may not allow the training package 121 (e.g., components, libraries, software, etc.) and/or the machine learning model 125 to transmit and/or receive data with any computing devices outside of the training environment 120. This may prevent the machine learning model 125 and/or the training package 121 from transmitting any portion of the training data 111 to external devices (e.g., computing devices that are outside of the training environment 120.

In one embodiment, the training component 122 may provide the training package 121 and/or the machine learning model 125 to the computing device 140 after the machine learning model 125 has been trained. For example, the training component 122 may transmit the trained machine learning model 125 and/or the training package 121 (which may include the trained machine learning model 125) directly to the computing device 140. In another example, the training component 122 may store the training package 121 and/or the machine learning model 125 on the blockchain system 130 and the computing device 140 may retrieve the training package 121 and/or the machine learning model 125 from the blockchain system 130. For example, the training package 121 and/or the machine learning model 125 may be encrypted using the public key of the computing device 140 and stored on the blockchain system 130. The computing device 140 may decrypt the training package 121 and/or the machine learning model 125 using a corresponding private key.

In one embodiment, the training component 122 may determine the size of the machine learning model 125 (e.g., a storage size, the amount of storage space used to store the machine learning model 125, etc.) before the machine learning model 125 was trained using the training data 111 (e.g., may determine a first size). The training component 122 may also determine the size of the machine learning model 125 after the machine learning model 125 was trained using the training data 111 (e.g., may determine a second size). The trained machine learning model 125 may have a larger size than the initial machine learning model 125 that was received in the training package 121. For example, after the initial machine learning model 125 is trained, the weights for the trained machine learning model 125 may be set/assigned. This may increase the size of the machine learning model 125.

In one embodiment, the training component 122 may determine a difference between the first size and the second size. For example, the training component 122 may compare the size of the machine learning model 125 before the machine learning model 125 was trained, with the size of the trained machine learning model 125 after it is trained. If the difference (e.g., the increase) in size is more than a threshold amount, the training component 122 may not transmit the trained machine learning model 125 and/or the training package 121 to the computing device 140 after the training. For example, if there is more than a two percent, ten percent, or some other appropriate amount of increase in the size of the trained machine learning model 125, the training component 122 may not transmit the trained machine learning model 125 to the computing device 140. In another example, if the difference in sizes is more than a few megabytes or some other appropriate amount of storage space, the training component 122 may not transmit the trained machine learning model 125 to the computing device 140. This may allow the training component 122 to prevent the computing device 140 from accessing the training data 111. For example, this may prevent the training package 121 and/or the machine learning model 125 from copying portions of the training data 111 into the training package 121 and/or machine learning model 125.

In one embodiment, the training component 122 may generate one or more hashes based on training data 111 that is used to train the machine learning model 125. For example, the training component 122 may generate a hash for each frame of a video, for each image, etc., as discussed above. The hashes (e.g., a first set of hashes) generated by the training component 122 may be used by the computing device 140 to verify that the correct training data 111 was used to train the machine learning model 125. For example, when the computing device 140 requests access to the training data 111, the storage system 110 may provide the computing device 140 with a set of hashes of the training data 111 (e.g., a second set of hashes generated based on the training data 111). The computing device 140 may compare the first set of hashes and the second set of hashes. If the first set of hashes and the second set of hashes match (e.g., each hash in the first set of hashes matches a corresponding hash in the second set of hashes, a threshold number of hashes from the first set of hashes and the second set of hashes match), the computing device 140 may determine that the correct set of training data 111 was used to train the machine learning model 125. If the first set of hashes and the second set of hashes do not match, the computing device 140 may determine that the training data 111 was not the training data that was requested (e.g., that the wrong set of training data was used). By generating hashes of the training data 111, the training component 122 may allow the computing device 140 to verify that the correct set of training data (e.g., the set of training data that was requested) was used, without granting the computing device 140 direct access to the training data 111. For example, even though the computing device 140 is not able to access the training data 111 or obtain a copy of the training data 111, the computing device 140 is able to use the hashes (generated by the storage system 110 and the training environment 120) to verify that the correct (e.g., requested) set of training data 111 was used to train the machine learning model 125. In some embodiments, one or more components, libraries, modules, etc., of the training package 121 may generate hashes of the training data. For example, a library of the training package 121 may be allowed (by the training component 122) to generate a hashes of the training data 111.

In one embodiment, the training component 122 may receive a request to verify the training data 111 (that was used to train the machine learning model 125), for the computing device 140. For example, the training component 122 may receive a message (e.g., a packet, a frame, etc.) from the computing device 140 indicating that the computing device 140 wants to verify the training data 111. The training component 122 may provide the hashes to the computing device 140. For example, the training component 122 may transmit the hashes directly to the computing device (via network 105). In another example, the training component 122 may store the hashes in the blockchain system 130 (e.g., may encrypt the hashes using a public key of the computing device 140 and may store the encrypted hashes in a ledger of the blockchain system 130). 16.

As discussed above, the collection, creation, curation, etc., of training data is often a difficult, costly, and/or complicated task. Once the training data is collected, created, curated, etc., the training data if often kept secret, confidential, private, etc. However, it may be useful to allow other machine learning models to be trained using the training data, while keeping the training data private or confidential. This may allow the training data to be used without losing control and/or confidentiality of the training data. The system architecture 100 illustrated in FIG. 1 may help address these issues when allowing access to training data for training machine learning models. Because the training data 111 is stored on the storage system 110 and only the training environment 120 is allowed to temporarily store/access the training data 111, the training data can be used by other machine learning models while keeping the training data private or confidential. The training environment 120 may prevent the training data 111 from being transmitted outside of the training environment 120 and delete the training data 111 after a period of time to maintain the confidentiality of the training data 111. This allows the training data to be used to train other machine learning models while keeping the training data private/confidential.

Figure 2:
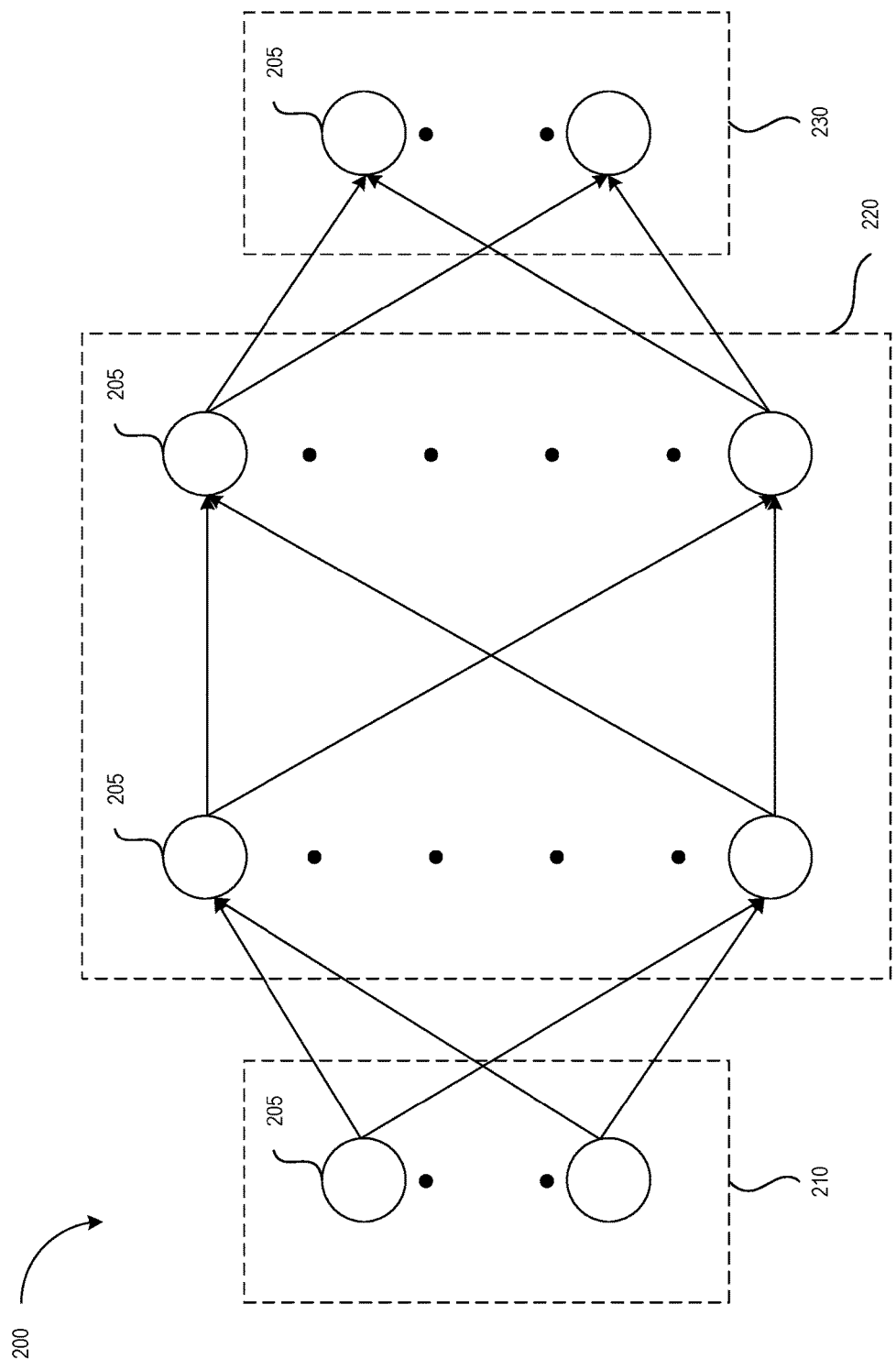
FIG. 2 is a diagram illustrating an example neural network, in accordance with one or more embodiments of the present disclosure.

FIG. 2 is a diagram illustrating an example neural network 200, in accordance with one or more embodiments of the present disclosure. The neural network 200 may be an example of a machine learning model 125 illustrated in FIG. 1 (e.g., a vehicle guidance model, an autonomous vehicle mode, a driver assistant model, etc.). The neural network 200 may be used to model relationships between (e.g., complex) inputs and outputs or to find patterns in data, where the dependency between the inputs and the outputs may not be easily ascertained. The neural network 200 may also be a computing model that may be used to determine a feature in input data through various computations. For example, the neural network 200 may determine a feature (e.g., a number, shape, pattern, etc.) in input data (e.g., audio data, image data, video data, etc.) according to a structure that defines a sequence of computations to be performed. The neural network 200 may also generate an output (e.g., an inference, a decision, etc.) based on the input data. For example, the neural network 200 may generate/determine a bounding box around an object in an image/video, or may generate/determine a path/trajectory for a vehicle.

The neural network 200 may be a convolutional neural network (CNN). A CNN may be a feed forward neural network where the connections between the nodes do not form a cycle (e.g., connections do not go backwards). The signals, messages, data, information etc., may not go backwards through the neural network (e.g., may not go from right to left). The neural network 200 includes an input layer 210, a hidden layer 220, and an output layer 20. Each of the input layer 210, the hidden layer 220, and the output layer 20 includes one or more nodes 205. Each of the input layer 210, the hidden layer 220, and the output layer 20 may have a different number of nodes 205. Each of the input layer 210, the hidden layer 220, and the output layer 230 may include multiple layers. For example, the hidden layer 220 may include two, ten, or some other appropriate number of layers. The hidden layer 220 may also be referred to as an intermediate layer or intermediate layers. The neural network 200 may be a deep neural network or a deep CNN. A neural network may be deep if the hidden layer 220 includes multiple levels (e.g., multiple sub-layers of nodes 205). Each of the nodes 205 in a layer is connected to another node 205 in the neural network 200.

Each connection may be associated with a weight or weight value (e.g., may have a weight). A weight or weight value may define coefficients applied to the computations. For example, the weights or weight values may be scaling factors between two or more nodes 205. Each node 205 may represent a summation of its inputs, and the weight or weight value associated with a connection may represent a coefficient or a scaling factor multiplied to an output of a node 205 in that connection. The weights between the nodes 205 may be determined, calculated, generated, assigned, learned, etc., during a training process for the neural network. For example, the neural network 200 may be trained using the training data 111, as discussed above. Thus, the weights of the hidden layers can be considered as an encoding of meaningful patterns in the data. The weights of the connections between the nodes 205 may be modified by additional training.

Although neural network 200 is depicted with a particular number of nodes 205, layers, and connections, various neural network architectures/configurations may be used in other embodiments. For example, different fully connected neural networks and partially connected neural networks (e.g., where all nodes in adjacent layers are not connected) may be used. In addition, some layer may be fully connected (e.g., output layer 230 may be a fully connected layer that includes multiple layers of nodes and the layers of nodes may be fully connected). Furthermore, other types of neural networks may also be used. For example, a recurrent neural network (RNN) may be used. A RNN may be a neural network that allows connections between nodes to form a cycle and/or may go in a backwards direction.

Figure 3:
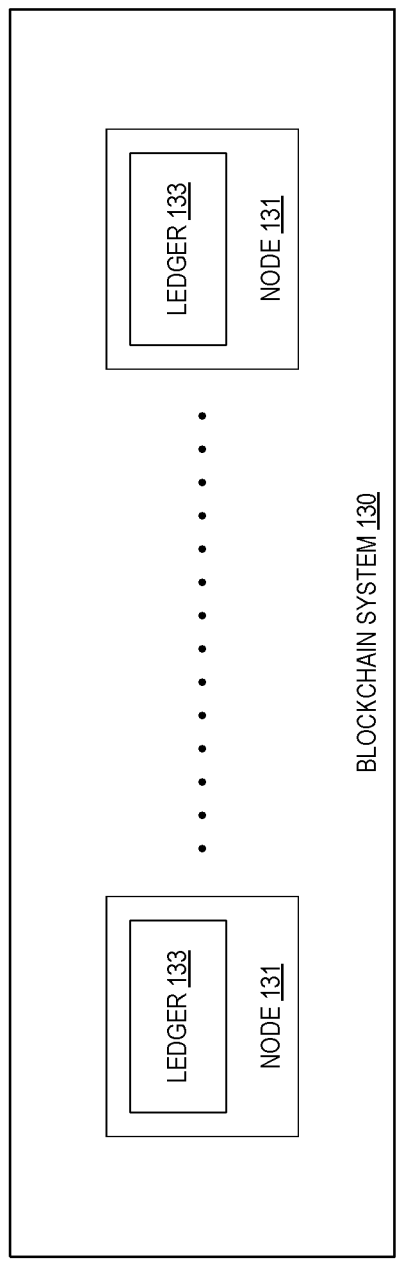
FIG. 3 is a block diagram that illustrates an example blockchain system, in accordance with one or more embodiments of the present disclosure.

FIG. 3 is a block diagram that illustrates an example blockchain system 130, in accordance with one or more embodiments of the present disclosure. The blockchain system 130 may be a system that uses a ledger 133 to store information and/or data that may be used to train a machine learning model. For example, the ledger 133 may include hashes that may be used to verify training data, training tokens, rating tokens, etc. The ledger 133 includes a plurality of blocks which are linked together and are secured using cryptographic functions. For example, each block may include a hash of the previous block, a timestamp, and other data (e.g., a copy of the message, a result, etc.). The blockchain system 130 includes a set of nodes 131 (e.g., one or more nodes 131, a plurality of nodes 131, etc.) coupled to each other via a network 105. The blockchain system 130 include any combination of computing devices and different types of virtual environments. For example, some nodes 131 may be VMs, some nodes 131 may be containers, and some nodes 131 may be computing devices.

In one embodiment, the blockchain system 130 may be a permissioned blockchain. A permissioned blockchain may be a blockchain where the nodes 131 (e.g., telecommunications nodes) are authenticated or given permission to be included in the blockchain system 130. For example, the nodes 131 may have been previously verified or authenticated with an administrator or an administrative group that manages or oversees the blockchain system 130. This may indicate that the nodes 131 are trusted by the blockchain system 130 and thus security requirements or operations for accessing the ledger 133 that may generally be used in blockchain systems may be relaxed or reduced. For example, the computational task (e.g., a computational challenge) for creating new entries may be removed or the complexity of the computational task may be reduced. A permissioned blockchain may also indicate which nodes 131 have what type of access to the ledger 133. For example, some nodes 131 may have read and write access to the ledger 133 and other nodes 131 may have read access to the ledger 133. In addition, nodes 131 may have their permissions modified or revoked. In other embodiments, the blockchain system 130 may be a general or public blockchain. A public blockchain may be a blockchain that allows any computing device to access the ledger 133. For example, any computing device coupled to the Internet may access, read from, and/or write to the ledger 133 in a public blockchain.

In some embodiments, the use of a computationally expensive task when creating entries in the ledger 133 may be reduced or relaxed when the blockchain system 130 is a permissioned blockchain. A general or public blockchain system may use a computationally expensive task (e.g., a task that uses a large amount of processing power or capability, such as computer large hashes, large numbers, etc.) to help maintain the authenticity or integrity of a ledger (e.g., a distributed ledger). Relaxing or reducing the computational task may allow the blockchain system 130 to create entries more quickly which may be useful because the nodes 131 may communicate large volumes or amounts of control information (e.g., requests to establish calls, requests to forward calls, requests to transmit SMS messages, etc.).

Each ledger 133 may be stored in a data store (not illustrated in the figures) of a respective node 131. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices.

The ledger 133 may also be referred to as a distributed ledger. Copies of the ledger 133 may be stored on nodes 131 of the blockchain system 130. For example, each node 131 of a blockchain system 130 may store a copy of the ledger 133. Because the ledger 133 is distributed across multiple nodes 131, it may be protected against loss (e.g., protected via replication). In addition, because blockchain system 130 may be a permissioned blockchain system, it helps prevent unauthorized users from accessing the blockchain. Furthermore, because the entries (or portions of the entries) of the ledger 133 are encrypted, this prevents unauthorized users from accessing (e.g., reading) the entries. The consensus mechanisms of the blockchain system 130 also prevent the ledger 133 from being modified by a malicious user because the malicious user would have great difficulty in compromising a majority of the nodes 131 in order to modify the ledger 133.

In one embodiment, the ledger 133 (e.g., a distributed ledger) may store training tokens that may be used to grant access to and/or allow the use of training data. For example, the training tokens generated, created, etc., by storage system (e.g., storage component 112) may be stored in the ledger 133 of the blockchain system 130. The training tokens may be encrypted using a public key and may be decrypted using a corresponding private key (e.g., may be encrypted/decrypted using a public/private key pair).

In one embodiment, the ledger 133 (e.g., a distributed ledger) may store rating tokens that may be used to rate (e.g., grade, evaluate, etc.) the training data. For example, the training tokens generated, created, etc., by storage system (e.g., storage component 112) may be stored in the ledger 133 of the blockchain system 130. The training tokens may be encrypted using a public key and may be decrypted using a corresponding private key (e.g., may be encrypted/decrypted using a public/private key pair).

In one embodiment, the ledger 133 (e.g., a distributed ledger) may store hashes that may be used to verify the training data used to train a machine learning model. For example, the hashes generated by the storage system 110 (e.g., the storage component 112), training environment 120 (e.g., training component 122), and/or the training package 121 may be stored in the ledger 133 of the blockchain system 130. The hashes may be encrypted using a public key and may be decrypted using a corresponding private key (e.g., may be encrypted/decrypted using a public/private key pair).

In one embodiment, the ledger 133 may store training data (e.g., sets of training data) that may be used to train a machine learning model. For example, the ledger 133 may store a set of training data that was requested by a computing device to train the machine learning model. The set of training data may be encrypted using a public key of the training environment where the machine learning model will be trained. The training environment may be able to decrypted the set of training using a corresponding private key.

Figure 4:
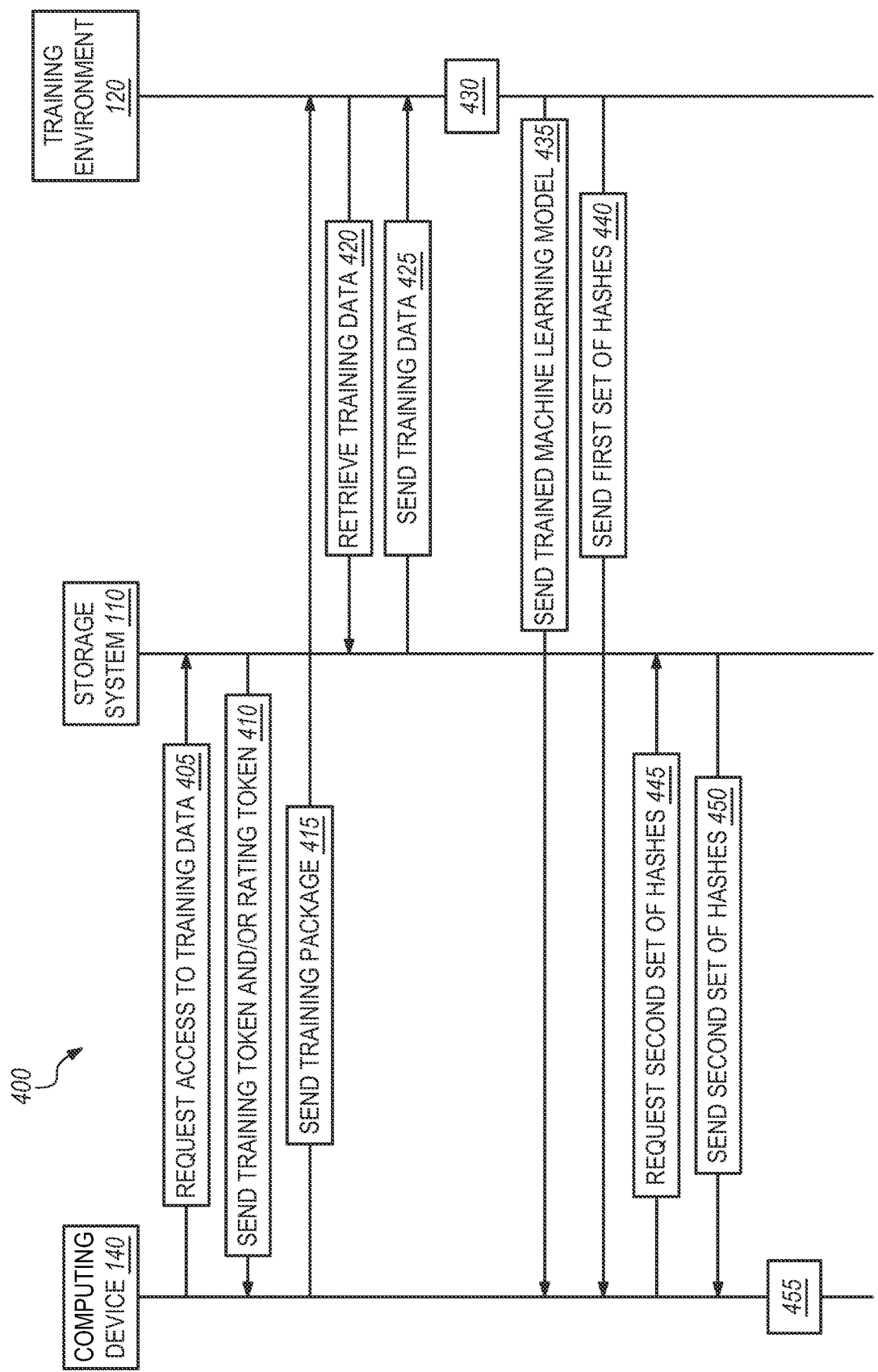
FIG. 4 is a diagram that illustrates an example sequence diagram, in accordance with one or more embodiments of the present disclosure.

FIG. 4 is a diagram that illustrates an example sequence diagram 400, in accordance with one or more embodiments of the present disclosure. The sequence diagram 400 may depict the operations, actions, methods, functions, etc., performed by the system architecture 100 illustrated in FIG. 1. For example, the operations of the storage system 110 (e.g., storage component 112, computing device 140, and training environment (e.g., training component 122) are illustrated in sequence diagram 400.

At block 405, the computing device 140 may request access to a set of training data. For example, the computing device 140 may transmit a message to request access to the set of training data. The storage system 110 may authenticate the computing device 140 (e.g., verify username/password, credentials, etc.) and may transmit a training token and/or rating token to the computing device 140 at block 410. As discussed above, the training token may be used to retrieve the set of training data from the storage system 110 and the rating token may be used to provide a rating for the set of training data. At block 415, the computing device 140 may send a training package 121 to the training environment 120. For example, the computing device 140 may transmit the training package to the training environment. The training package may include the training token that may be used by the training environment 120 to retrieve the set of training data from the storage system 110. The training package may also include a machine learning model that is to be trained within the training environment 120 using the set of training data. The training package may also include libraries, modules, components, and/or other software that may support the execution/operation of the machine learning model.

At block 420, the training environment 120 may retrieve the training data. For example, the training environment 120 may transmit a messages to the storage system 110 to request the training data. At block 425, the storage system 110 may transmit the requested training data to the training environment. At block 430, the training environment 120 may train the machine learning model using the training data. For example, the training environment 120 may run/execute the machine learning model and may provide the training data to the machine learning model as input. The training environment 120 may also generate a first set of hashes of the training data at block 430. For example, the training environment 120 may generate a hash for each image, or a hash for each frame of a video. At block 435, the training environment may transmit the trained machine learning model to the computing device 140. As discussed above, the training environment may send the trained machine learning model if the size of the machine learning model has not increased by more than a threshold amount. The training environment may also transmit the first set of hashes (of the training data) to the computing device 140 at block 440.

At block 445, the computing device may request a second set of hashes from the storage system 110. The second set of hashes may be hashes of the training data that was provided to the training environment at block 425. The second set of hashes may be generated by the storage system 110. At block 450, the storage system 110 may transmit the second set of hashes to the computing device 140. At block 455, the computing device 140 may verify the training data based on the first set of hashes and the second set of hashes. For example, the computing device 140 may determine whether the first set of hashes matches the second set of hashes.

Figure 5:
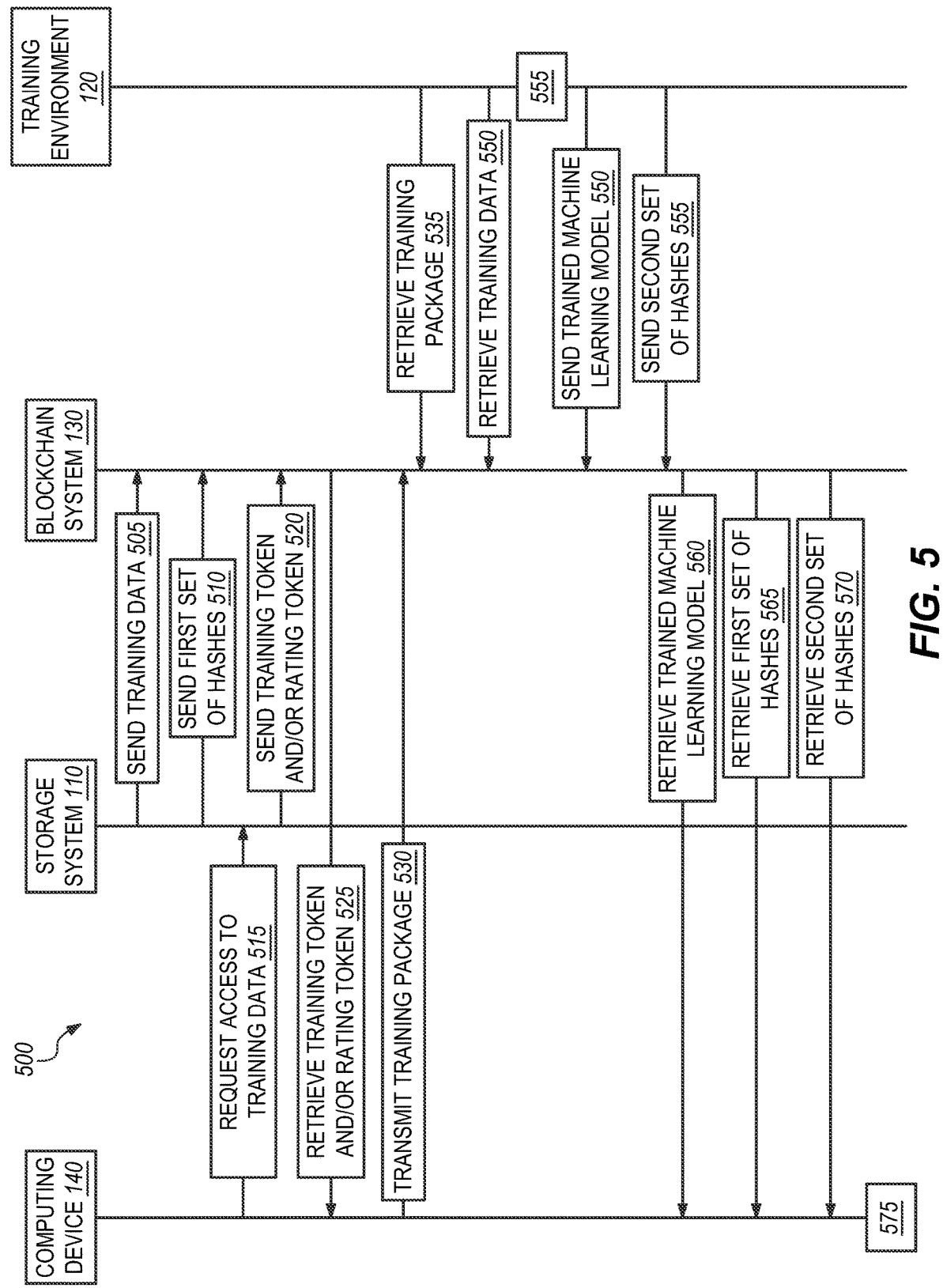
FIG. 5 is a diagram that illustrates an example sequence diagram, in accordance with one or more embodiments of the present disclosure.

FIG. 5 is a diagram that illustrates an example sequence diagram 500, in accordance with one or more embodiments of the present disclosure. The sequence diagram 500 may depict the operations, actions, methods, functions, etc., performed by the system architecture 100 illustrated in FIG. 1. For example, the operations of the storage system 110 (e.g., storage component 112, computing device 140, blockchain system 130, and training environment (e.g., training component 122) are illustrated in sequence diagram 400.

At block 505, the storage system may send and/or store a set of training data on the blockchain system 130. For example, the storage system may encrypt the training data using a public key of the training environment 120 and may store the encrypted training data on the blockchain system 130 (e.g., in the ledger of the blockchain system). The storage system 110 may also send a first set of hashes of the set of training data to the blockchain system 130 at block 510. For example, the storage system 110 may encrypt the set of hashes using the public key of the training environment 120 and may store the set of hashes in the ledger of the blockchain system 130.

At block 515, the computing device may request access to the training data. For example, the computing device may transmit a message to the storage system 110 to request access to the training data. At block 520, the storage system 110 may authenticate the computing device 140 (e.g., determine whether the computing device 140 should be allowed to use the training data to train a machine learning model), as discussed above. The storage system 110 may also send one or more of a training token and/or a rating token to the blockchain system 130 at block 520. For example, the storage system 110 may encrypt the training toke token and/or rating token using a public key of the computing device 140 and store the encrypted tokens on a ledger of the blockchain system 130. At block, 525, the computing device 140 may retrieve the training token and/or rating token from the blockchain system 130. For example, the computing device 140 may retrieve the encrypted tokens and decrypt them with a private key of the computing device 140. At block 530, the computing device 140 may transmit a training package to the blockchain system 130. For example, the computing device 140 may encrypt the training package with a public key of the training environment 120 and may store the encrypted training package on the ledger of the blockchain system 130.

At block 535, the training environment 120 may retrieve the training package (e.g., the encrypted training package) from the blockchain system 130. As discussed above, the training package may use the training token that was provided to the computing device via the blockchain system 130 at block 525. The training environment 120 may retrieve the training data from the blockchain system 130 at block 550. At block 555, the training environment 120 may train the machine learning model using the training data. The training environment 120 may transmit the trained machine learning model to the blockchain system 130 at block 550. For example, the training environment 120 may encrypt the trained machine learning model using a public key of the computing device 140 and may store encrypted, trained machine learning model on the blockchain system 130. The training environment 120 may also check the size of the trained machine learning model, as discussed above. At block 555, the training environment 120 may generate a second set of hashes of the training data and may transmit the second set of hashes to the blockchain system 130. For example, the training environment 120 may encrypt the second set of hashes using a public key of the computing device 140 and may store the encrypted second set of hashes on the blockchain system 130.

At block 560, the computing device 140 may retrieve the trained machine learning model 125 from the blockchain system 130. For example, the computing device 140 may read the ledger of the blockchain system 130 and retrieve the encrypted machine learning model. The computing device 140 may also decrypt the encrypted machine learning model using a private key of the computing device 140. At block 565, the computing device 140 may retrieve the first set of hashes (generated by the storage system 110) from the blockchain system 130. The computing device 140 may also retrieve the second set of hashes (generated by the training environment 120) at block 570. At block 575, the computing device 140 may verify the training data based on the first set of hashes and the second set of hashes. For example, the computing device 140 may decrypt the first set of hashes and the second set of hashes, and may determine whether the first set of hashes matches the second set of hashes.

Figure 6:
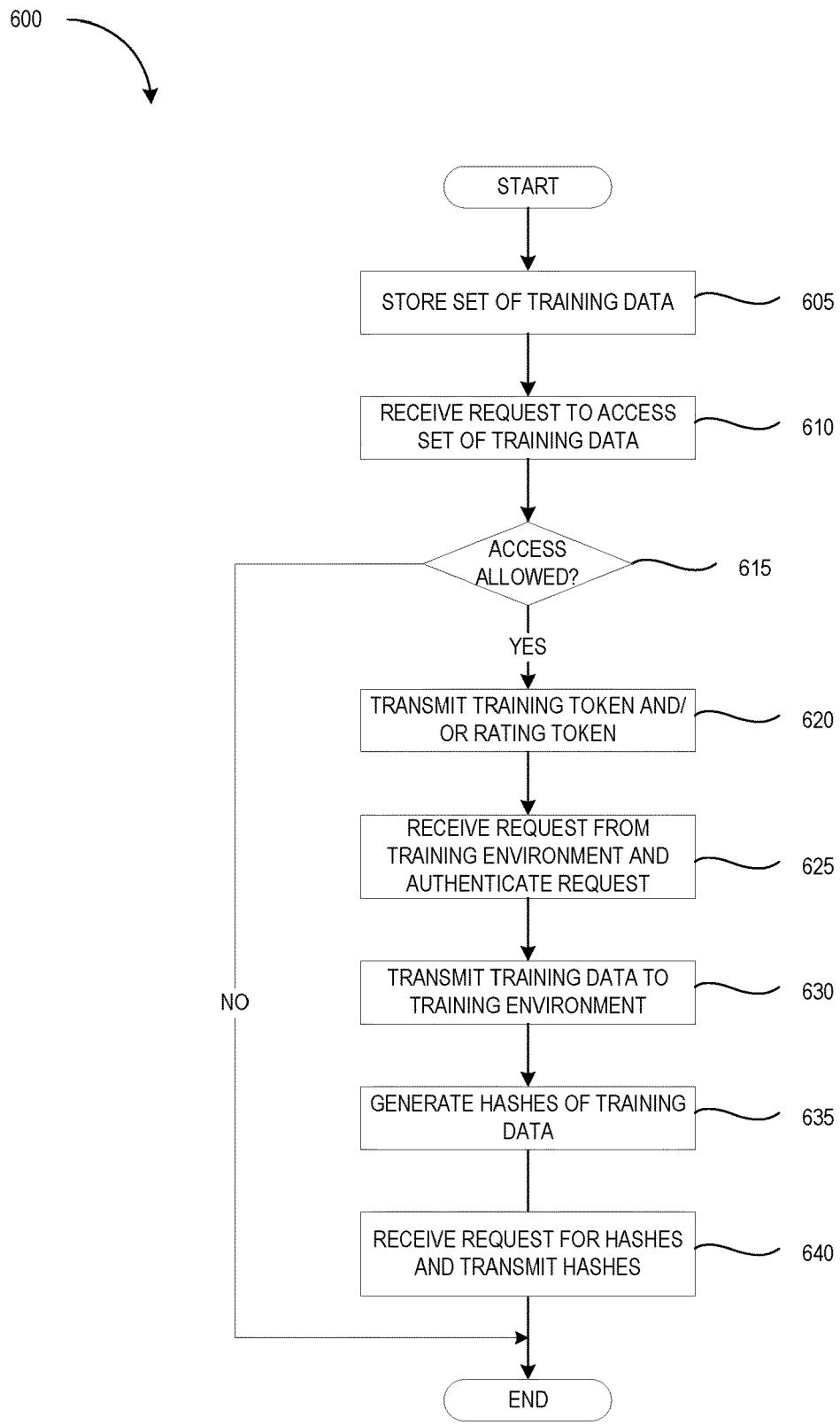
FIG. 6 is a flow diagram of a process for providing training data, in accordance with one or more embodiments of the present disclosure.

FIG. 6 is a flow diagram of a process 600 for providing training data, in accordance with one or more embodiments of the present disclosure. Process 600 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by a storage component, a storage system, a computing device, etc.

The process 600 begins at block 605 where the process 600 stores a set of training data. As discussed above, the training data may be images, videos, sensor data, diagnostic data, or other data that may be used to train various machine learning models. At block 610, the process 600 may receive a request to access a set of training data from a computing device. For example, a computing device may request access to the set of training data to train a machine learning model. At block 615, the process 600 may determine whether access is allowed to the set of training data. For example, the process 600 may authenticate a username/password or other security credential of the computing device. If access to the set of training data is not allowed (e.g., the security credentials are not valid), the process 600 ends.

If access to the set of training data is allowed, the process 600 proceeds to block 620 where the process 600 may transmit and/or a provide a training token and/or a rating token to the computing device. For example, the process 600 may transmit the training token and/or rating token to the computing device directly or via a blockchain system, as discussed above. At block 625, the process 600 may receive a request from a training environment to access the set of training data. The request may include the training token that was provided to the computing device. The training environment may also authenticate the request (e.g., authenticate, verify, validate, etc., the training token) at block 625.

At block 630, the process 600 may transmit the set of training data to the training environment. As discussed above, the set of training data is temporarily stored in the training environment while the machine learning model is trained. After the machine learning model is trained, the training environment may delete the set of training data. At block 635, the process 600 may generate a set of hashes of the training data. As discussed above, the set of hashes may be used to verify the training data. At block 640 the process 600 may receive a request for the set of hashes from the computing device and may transmit the set of hashes to the computing device.

Figure 7:
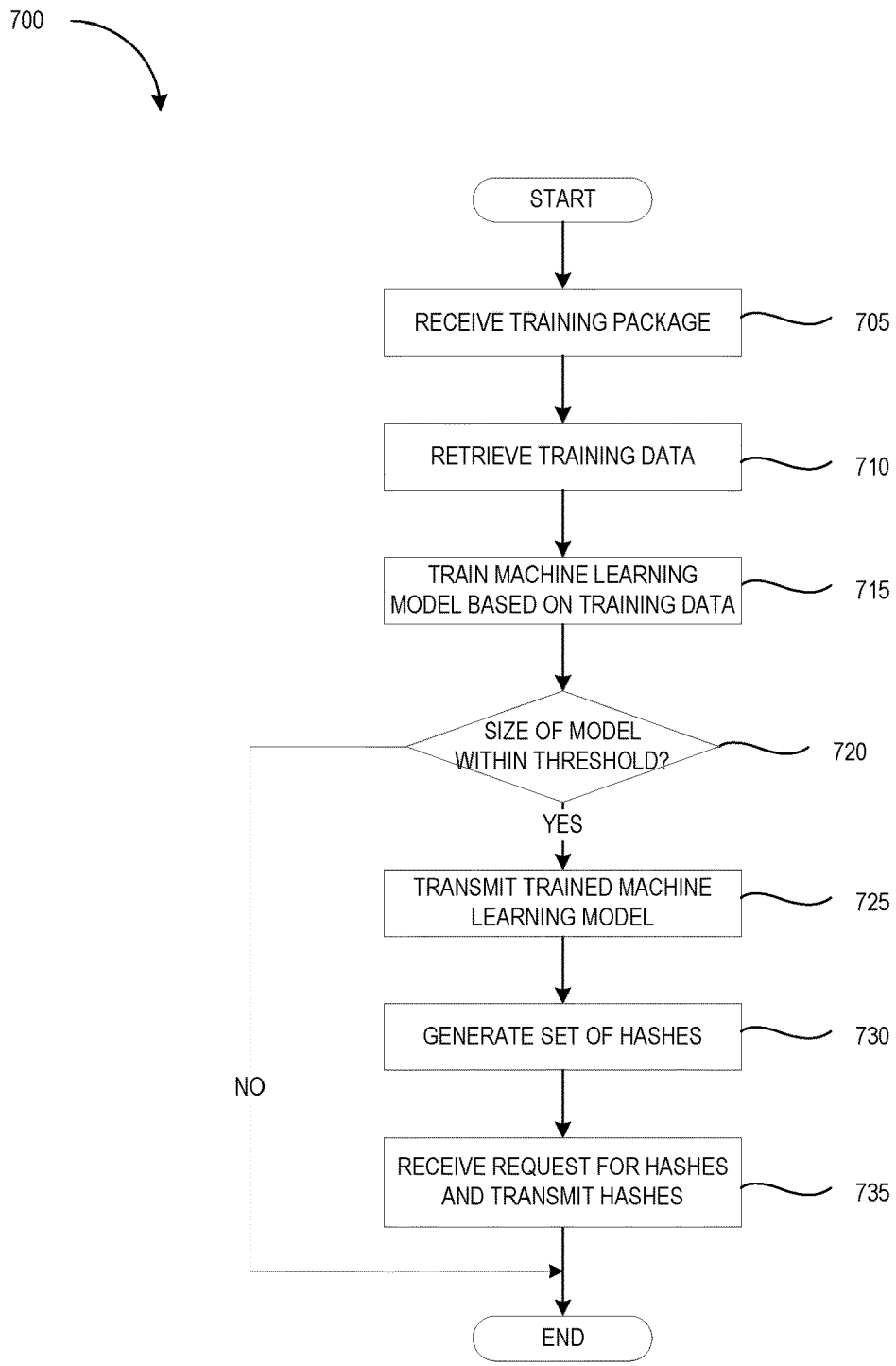
FIG. 7 is a flow diagram of a process for training a machine learning model, in accordance with one or more embodiments of the present disclosure.

FIG. 7 is a flow diagram of a process 700 for training a machine learning model, in accordance with one or more embodiments of the present disclosure. Process 700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 700 may be performed by a training component, a training environment, a computing device, etc.

The process 700 begins at block 705 where the process 700 receives a training package from a computing device. The training package may include a machine learning model that will be trained in the training environment. The training package may also include a training token and/or other modules, components, software, etc., that may be used to execute, run, or operate the machine learning model. At block 710, the process 700 may retrieve a set of training data from a storage system using the training token. At block 715, the process 700 may train the machine learning model using the set of training data. For example, the process 700 may execute the machine learning model and provide the set of training data as an input to the machine learning model.

At block 720, the process 700 may determine whether the size of the trained machine learning model is within a threshold size of the machine learning model before it was trained. For example, the process 700 may determine the size of the trained machine learning model and compare it with the size of the machine learning model before it was trained. If the difference in sizes is not less than a threshold size (e.g., the size of the trained machine learning model exceeds a threshold), the process 700 ends. If the difference in sizes is less than a threshold size (e.g., the size of the trained machine learning model does not exceed a threshold), the process 700 may transmit the trained machine learning model to the computing device. At block 730, the process 700 may generate a set of hashes of set of training data used to train the machine learning model. At block 735, the process 700 may receive a request for the set of hashes from the computing device and may transmit the set of hashes to the computing device. Optionally, the process 700 may transmit the set of hashes to the computing device without receiving the request first (e.g., may automatically transmit the set of hashes to the computing device after training the machine learning model).

Figure 8:
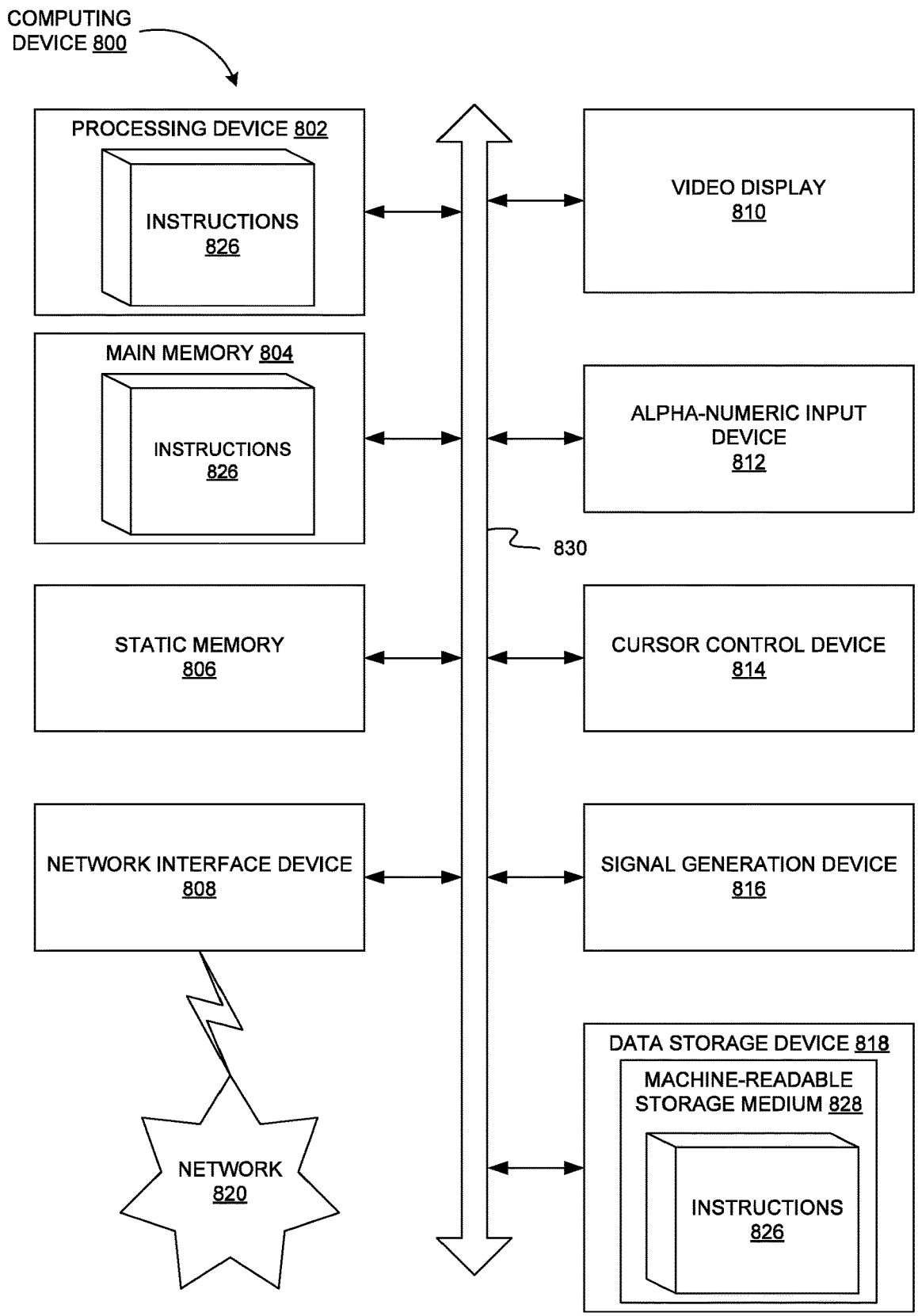
FIG. 8 is a block diagram of an example computing device that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions for carrying out the operations described herein, in accordance with one or more aspects of the present disclosure. Instructions 826 implementing the different systems, modules, components, etc., described herein (e.g., the computing device 140, the storage component 112, the training component 122, the blockchain system 130, etc., illustrated in FIG. 1) may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "storing," "receiving, "determining," "transmitting," "training," "obtaining," "generating," "retrieving" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. In addition, other operations may be performed between two operations that are illustrated/described.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    storing a set of training data, wherein one or more machine learning models are trained based on the set of training data;
    receiving, from a computing device, a request to access the set of training data;
    determining whether the computing device is allowed to access the set of training data; and
    in response to determining that the computing device is allowed to access the set of training data, then:
        transmitting a training token to the computing device, the training token being valid for a period of time;
        the computing device transmitting the training token to a training environment comprising an isolated environment for training the machine learning model;
        the training token granting the training environment with access to the set of training data for the period of time for which the training token is valid; and
        the training environment deleting the set of training data after the training environment determines that the period of time has expired in order to maintain confidentiality of the training data.

2. The method of claim 1, further comprising:
    receiving a request from the training environment to retrieve the set of training data;
    authenticating the request from the training environment based on the training token; and
    transmitting the set of training data to the training environment.

3. The method of claim 1, wherein the request from the training environment to retrieve the set of training data comprises one or more of:
    the training token;
    a first identifier for the first machine learning model;
    a second identifier for the computing device; and
    a third identifier for the set of training data.

4. The method of claim 1, further comprising:
    generating a set of hashes based on the set of training data, wherein the set of hashes allow the set of training data to be verified.

5. The method of claim 4, further comprising:
    receiving a request from the computing device to verify the set of training data; and
    transmitting the set of hashes to the computing device.

6. The method of claim 1, further comprising:
    transmitting a rating token to the computing device, wherein the rating token allows the computing device to provide a rating for the set of training data.

7. The method of claim 1, wherein:
    the set of training data is stored on a storage system;
    the storage system is separate from the training environment;
    the set of training data is inaccessible to any devices outside of the training environment.

8. The method of claim 1, wherein:
    one or more of the training token, a rating token, and a set of hashes associated with the set of training data are stored in a blockchain system; and
    the blockchain system is accessible by the training environment and a storage system that stores the set of training data.

9. A method, comprising:
receiving a training package from a computing device, wherein the training package comprises a first machine learning model that is to be trained based on a set of training data stored in a storage system;
retrieving the set of training data from the storage system based on a training token provided to the computing device by the storage system;
training the first machine learning model within a training environment based on the set of training data to generate a trained machine learning model, wherein the set of training data is inaccessible to the first machine learning model outside of the training environment, the training environment comprising an isolated environment for training the machine learning model;
deleting the set of training data within the training environment after training the first machine learning model in order to maintain confidentiality of the training data; and
transmitting the trained machine learning model to the computing device.

10. The method of claim 9, wherein retrieving the set of training data comprises:
transmitting a request to the storage system to retrieve the set of training data; and
receiving the set of training data from the storage system after the training token is authenticated by the storage system.

11. The method of claim 10, wherein the request to the storage system to retrieve the set of training data comprises one or more of:
the training token;
a first identifier for the first machine learning model;
a second identifier for the computing device; and
a third identifier for the set of training data.

12. The method of claim 9, further comprising:
determining a first size of the first machine learning model and a second size of the trained machine learning model.

13. The method of claim 12, wherein transmitting the trained machine learning model to the computing device comprises:
determining whether a difference between the first size and the second size is less than a threshold size; and
transmitting the trained machine learning model to the computing device in response to determining that the difference between the first size and the second size is less than the threshold size.

14. The method of claim 9, wherein:
the training environment prevents components of the training package from communicating with external devices;
the training environment prevents the first machine learning model from communicating with external devices; and
the training data is inaccessible to any devices outside of the training environment.

15. The method of claim 9, further comprising:
generating a set of hashes based on the set of training data, wherein the set of hashes allow the set of training data to be verified.

16. The method of claim 15, further comprising:
receiving a request from the computing device to verify the set of training data; and
transmitting the set of hashes to the computing device.

17. The method of claim 15, further comprising:
storing the set of hashes in a blockchain system.

18. An apparatus, comprising:
a memory configured to store data; and
a processing device operatively coupled to the memory, the processing device configured to:
receive a training package from a computing device, wherein the training package comprises a first machine learning model that is to be trained based on a set of training data stored in a storage system;
receive the set of training data from the storage system based on a training token provided to the computing device by the storage system;
train the first machine learning model within a training environment based on the set of training data to generate a trained machine learning model, wherein the set of training data is inaccessible to the first machine learning model outside of the training environment, the training environment comprising an isolated environment for training the machine learning model;
delete the set of training data within the training environment after training the first machine learning model to maintain confidentiality of the training data; and
transmit the trained machine learning model to the computing device.

19. The apparatus of claim 18, wherein the processing device is further configured to:
determine a first size of the first machine learning model and second size of the trained machine learning model.

20. The apparatus of claim 19, wherein to transmit the trained machine learning model to the computing device the processing device is further configured to:
determine whether a difference between the first size and the second size is less than a threshold size; and
transmit the trained machine learning model to the computing device in response to determining that the difference between the first size and the second size is less than the threshold size.

* * * * *